Oct. 6, 1925.
F. A. BUMPUS
1,556,414
AEROPLANE WITH FOLDING WINGS
Filed July 11, 1925  2 Sheets-Sheet 1
– Fig. 1.–
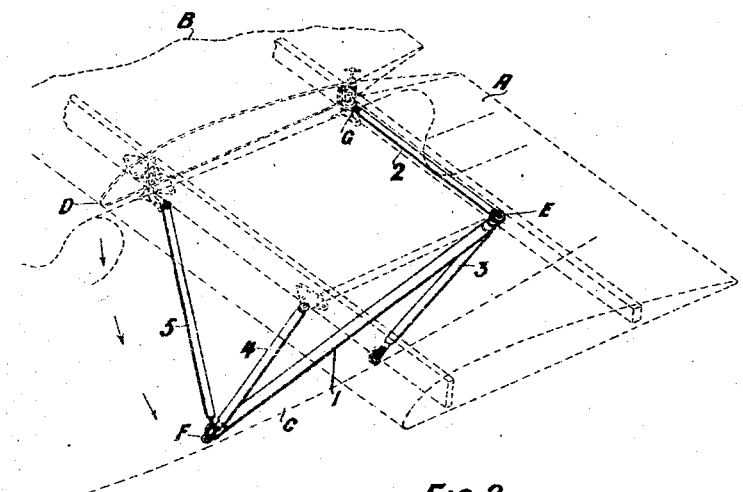
– Fig. 2.–
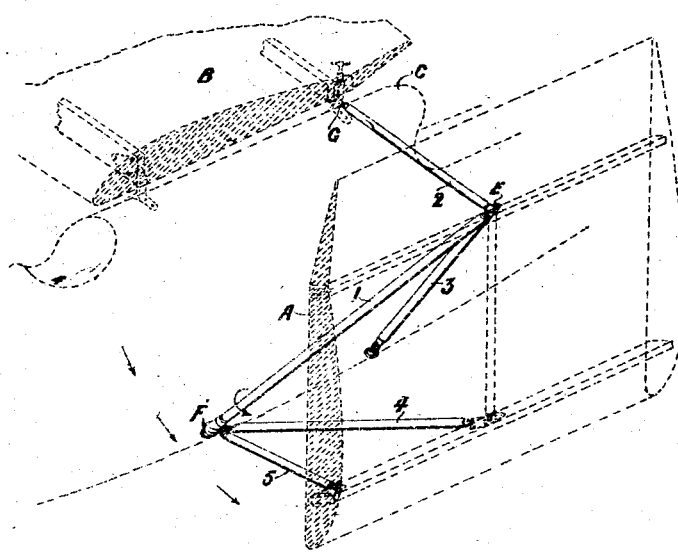
Inventor
Frank Arnold Bumpus
By
his Attorneys Oct. 6, 1925.

F. A. BUMPUS

AEROPLANE WITH FOLDING WINGS

Filed July 11, 1925    2 Sheets-Sheet 2

1,556,414

Inventor
Frank Arnold Bumpus

Patented Oct. 6, 1925.

1,556,414

UNITED STATES PATENT OFFICE.

FRANK ARNOLD BUMPUS, OF ELLOUGHTON, BROUGH, NEAR HULL, ENGLAND, ASSIGNOR TO THE BLACKBURN AEROPLANE & MOTOR COMPANY LIMITED, OF YORKSHIRE, ENGLAND.

AEROPLANE WITH FOLDING WINGS.

Application filed July 11, 1925. Serial No. 42,943.

*To all whom it may concern:*

Be it known that I, FRANK ARNOLD BUMPUS, a subject of the King of Great Britain, residing at Elloughton, Brough, near Hull, Yorkshire, England, have invented certain new and useful Improvements in Aeroplanes with Folding Wings, of which the following is a specification.

This invention relates to monoplane aeroplanes, in which each wing is adapted to turn about an oblique axis, so that it may be turned from the flying position where it extends laterally from the fuselage to a position where it extends rearwardly of the machine and substantially parallel to the fuselage, the chord of the wing in the folded position being approximately vertical.

The wings are divided from each other about centrally, or are divided from a fixed central portion, and each wing is mounted on an oblique axis, said axes being so inclined with respect to the fuselage and at such angles and so located relatively thereto, that the main bodies of the wings can be turned in an angular direction about such axes from their normal flying positions into substantially vertical positions wherein each wing is substantially parallel with the fuselage. Means of any suitable or known construction are provided to retain the wings in their flying position by detachably locking the wings together at the central division or by locking the wings to the fixed central portion.

The invention therefore differs from instances where it has been proposed to vary the angles of the wings relatively to the fuselage, and to fold the wings back against one another into approximately a horizontal position over the top of the fuselage, by carrying the wings on axles which converge towards one another in the form of a V with the point of the V directed forwards and downwards.

The present invention further consists in means for carrying and supporting the pivots upon which each wing can be caused to turn, whereby, when the wing is to be folded rearwardly into a substantially vertical position alongside the fuselage, the upper and rearward pivot, entering a bearing in the wing, is carried from a triangulated structure fixed to and extending outwardly from the side of the fuselage, and the forward and lower pivot, entering a bearing in the fuselage, is carried by a triangulated structure extending downwardly from the under side of the wing, the two pivots being in the same axis.

In the drawings,

Fig. 1 is a diagram perspective view showing the wings in their extended position, and Fig. 2 is a similar diagram showing one of the wings folded into the position it is caused to assume by this invention.

Figure 3:
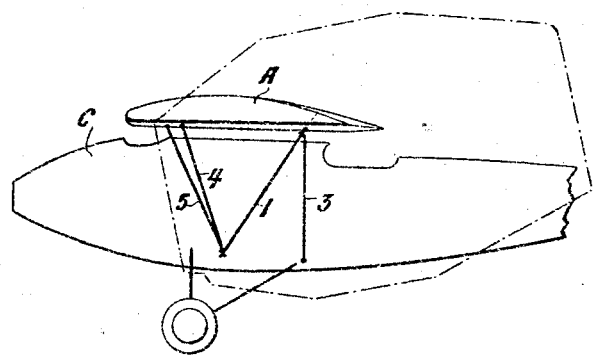
Fig. 3 is a diagram side elevation.

Referring more particularly to Fig. 1, the wings A, B are divided above the fuselage C at D, although it is to be understood that there may be a central portion of the wings, fixed to the fuselage, from which central portion the main body of the wings is divided, it being unnecessary to show this somewhat obvious modification in the drawing.

Since the pivotal mounting of one wing is similar to the pivotal mounting of the other wing, it will be sufficient to describe the mounting of the wing A. The wing A, when free to do so, is movable about an upper pivot E and a lower coaxial pivot F which may conveniently be carried by a shaft 1 which is obliquely inclined outwardly and rearwardly with respect to the fuselage C; the upper pivot E having a bearing in the wing A, while the lower pivot F has a bearing carried by the fuselage or its framework. The upper pivot E is supported by a triangulated structure comprising a stay 2 fixed at one end at G in any convenient manner to the fuselage, and at the other end embracing the pivot E, while also a stay 3 is fixed at its upper end to an extension or bracket on the end of the stay 2, and at its lower end is fixed to the fuselage, and the shaft 1 constitutes as it were the third member of a triangulated structure comprising the stays 2 and 3 and the shaft 1.

The wing is further supported by a stay 4, the upper end of which is fixed to the under surface of the wing, while the lower end is fixed to a bracket around the pivot F, and a second stay 5 also has its lower end fixed to a bracket around the pivot F, while its upper end is fixed to the under side of the wing, so that a second triangulated structure is constituted, comprising the stays 4 and 5 and the shaft 1, which is common to both the triangulated structures.

Thus the upper and rearward pivot E, as aforesaid, entering a bearing in the wing, is carried from a triangulated structure fixed to and extending outwardly from the side of the fuselage, while the forward and lower pivot entering a bearing on the fuselage, is carried by a triangulated structure extending downwardly from the under side of the wing, the two pivots E and F being in the same axis.

When the wings are in their extended positions as indicated in the diagram at Fig. 1, the meeting surfaces of the wings at D are detachably connected together by suitable bolts or other fastenings.

The wings A and B can be turned in a rearward angular direction about the pivots E and F, from the position shown at Fig. 1 to the position in which one of the wings A is illustrated at Fig. 2, after releasing the connections between the meeting surfaces of the wings A and B at the division D, and when so turned about the pivots E and F from the normal flying position, the wings will assume positions wherein each wing is substantially parallel with the fuselage and extends rearwardly, with the chords of the wings approximately vertical.

Figure 4:
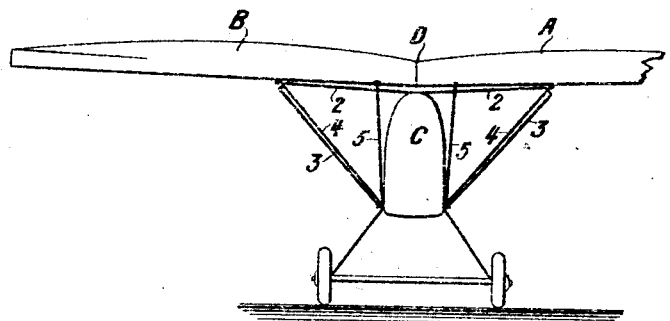
Fig. 4 is a front elevation, of the forward part of a machine with the wings extended.
Figure 5:
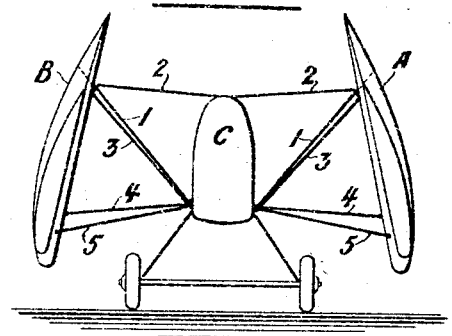
Fig. 5 is a front elevation with both of the wings folded, the invention being shown applied to an aeroplane in which the wings extend outwardly from the upper part of the fuselage, being divided centrally above the fuselage.

Both of the wings A and B are shown turned into their substantially vertical positions at Fig. 5, and are shown extended at Figs. 3 and 4.

Where a central portion is fixed and carried by the fuselage, the division between the movable and such fixed portion may extend parallel with the fuselage from the trailing edge of the wing to a short distance beyond the pivot E, and then the division may incline forwardly and angularly towards the fuselage.

It is not essential to this invention that the monoplane wing should be fixed to the upper part of the fuselage, since the invention is applicable where the wing is fixed and carried from the lower part of the fuselage, and in such a case the wings may be divided as previously described, while the oblique shaft 1 will extend at an angle away from the upper part of the fuselage, downwardly and outwardly, and will be inclined rearwards, so that the oblique shaft will then extend from the upper surface of the wing to the upper part of the fuselage.

What I claim as my invention and desire to claim by Letters Patent is:—

1. In monoplane aeroplanes having folding wings in which said wings are divided from each other about centrally of the machine and from the leading to the trailing edges; the combination of a central fuselage, an outstanding bracket on each side of said fuselage, a bearing carried at the outer extremity of said bracket, a wing pivotally mounted on said bearing, a more forwardly located outstanding bracket fixed to the under side of each wing and extending downwards, a bearing carried on said bracket and fulcrumed on said fuselage, said two bearings being so located relatively to each other that their common axis projects from the fuselage outwards, rearwards and upwards to permit said wings to be folded from extended flying positions to positions where the chord of each wing is vertical, and means for locking the wings when in the flying position.

2. In monoplane aeroplanes having folding wings in which said wings are divided from each other about centrally of the machine and from the leading to the trailing edges; the combintion of a central fuselage, a first bracket structure fixed to and outstanding laterally from each side of said fuselage, a bearing carried at the outer extremity of said first bracket structure, a shaft passing through said bearing of said first bracket structure the upper end of said shaft pivotally engaging the wing, a bearing at the lower part of said fuselage to receive the lower end of said shaft, a second bracket structure fixed to the under side of each wing extending downwards and connected to said shaft near the lower end thereof, said shaft extending from said bearing on said fuselage outwards, rearwards and upwards to permit said wings to be turned about the axes of said shafts to be folded from extended flying positions to positions parallel with said fuselage with the chord of each wing vertical, and means for locking said wings in the flying position.

3. In monoplane aeroplanes having folding wings in which said wings are divided from each other about centrally of the machine and from the leading to the trailing edges; the combination of a central fuselage, a first bracket structure fixed to and outstanding laterally from each side of said fuselage beneath the rearward part of each wing, a bearing carried at the upper extremity of said first bracket structure, a shaft passing through said bearing of said first bracket structure the upper end of said shaft engaging said wing, a forwardly located bearing on the lower part of said fuselage to receive the lower end of said shaft, a second bracket structure fixed to the under side of said wing at the forward part of same extending downwards and connected to said shaft near the lower end thereof, said shaft extending from said bearing on said fuselage outwards, rearwards and upwards to permit said wings to be turned about the axes of said shafts to be folded from extended flying positions to positions parallel with said fuselage with the chord of each wing vertical, and means for locking said wings in the flying position.

4. In monoplane aeroplanes having folding wings in which said wings are divided from each other about centrally of the machine and from the leading to the trailing edges; the combination of a central fuselage, a first bracket structure fixed to and outstanding laterally from each side of said fuselage beneath the rearward part of each wing, each bracket structure comprising a stay fixed at one end to said fuselage extending outwardly therefrom about horizontally, a second stay fixed at its lower end to said fuselage extending angularly upwards the opposite ends of said stays conjoining, a bearing carried by the conjoined ends of said stays, a shaft passing through said bearing of said first bracket structure, the projecting upper end of said shaft engaging said wing, a forwardly located bearing on the lower part of said fuselage to receive the lower end of said shaft, a second bracket structure fixed to the under side of said wing at the forward part of same and extending downwards, said second bracket structure comprising a first stay having its upper end fixed to the under forward surface of said wing at a distance from the division of the wings, and a second stay having its upper end fixed to the under side of said wing adjacent said division, the said stays extending angularly and conjoining at their lower ends, means for connecting said conjoined ends to the lower end of said shaft, said shaft extending from said bearing on said fuselage outwards, rearwards and upwards to permit said wings to be turned about the axes of said shafts to be folded from extended flying positions to positions parallel with said fuselage with the chord of each wing vertical, and means for locking said wings in the flying position.

In witness whereof I have hereunto set my hand.

FRANK ARNOLD BUMPUS.